United States Patent
Leng

(10) Patent No.: US 7,855,520 B2
(45) Date of Patent: Dec. 21, 2010

(54) LIGHT-EMITTING DIODE DRIVING CIRCUIT AND SECONDARY SIDE CONTROLLER FOR CONTROLLING THE SAME

(75) Inventor: Chung-Ming Leng, Sijhih (TW)

(73) Assignee: Niko Semiconductor Co., Ltd. (TW)

( * ) Notice: Subject to any disclaimer, the term of this patent is extended or adjusted under 35 U.S.C. 154(b) by 0 days.

(21) Appl. No.: 12/050,993

(22) Filed: Mar. 19, 2008

(65) Prior Publication Data

US 2009/0237007 A1 Sep. 24, 2009

(51) Int. Cl.
*H05B 37/02* (2006.01)
(52) U.S. Cl. .................... 315/307; 315/209 R; 315/294
(58) Field of Classification Search ............. 315/209 R, 315/210, 246, 247, 250, 291, 294, 307–308, 315/312, 324; 345/82–83, 204
See application file for complete search history.

(56) References Cited

U.S. PATENT DOCUMENTS

| | | | | |
|---|---|---|---|---|
| 2006/0082529 A1* | 4/2006 | Oyama | ......................... | 345/82 |
| 2007/0001619 A1* | 1/2007 | Kang et al. | .................. | 315/247 |
| 2007/0247084 A1* | 10/2007 | Zhao | .......................... | 315/291 |
| 2008/0018261 A1* | 1/2008 | Kastner | ....................... | 315/192 |
| 2008/0111800 A1* | 5/2008 | Wang et al. | .................. | 345/204 |
| 2008/0122551 A1* | 5/2008 | Lee et al. | ..................... | 332/109 |
| 2008/0129220 A1* | 6/2008 | Shteynberg et al. | ......... | 315/291 |
| 2008/0203946 A1* | 8/2008 | Ito et al. | ..................... | 315/307 |
| 2008/0224636 A1* | 9/2008 | Melanson | .................... | 315/307 |
| 2008/0238337 A1* | 10/2008 | Masood | ....................... | 315/294 |
| 2008/0297069 A1* | 12/2008 | Shao et al. | ................... | 315/307 |
| 2009/0184662 A1* | 7/2009 | Given et al. | ................. | 315/294 |
| 2009/0189546 A1* | 7/2009 | Chang Chien et al. | ...... | 315/307 |

* cited by examiner

*Primary Examiner*—Douglas W Owens
*Assistant Examiner*—Tung X Le
(74) *Attorney, Agent, or Firm*—Schmeiser, Olsen & Watts, LLP

(57) ABSTRACT

A light-emitting diode (LED) driving circuit and a secondary side controller for controlling the same control an output voltage of the LED driving circuit at a first driving voltage or a second driving voltage. When the output voltage is controlled at the first driving voltage, an LED module driven by the LED driving circuit is in a stably lighting state; and when the output voltage is controlled at the second driving voltage, the output voltage is approximately a threshold voltage of the LED module but higher than zero volt, so that the LED module is close to not emitting light. Therefore, in a dimming operation, the variation of voltage applied across the LED module is smaller than that in the conventional LED driving circuits to thereby protect the LED module against an excessive voltage stress and avoid the problem of inaccurate dimming.

17 Claims, 4 Drawing Sheets

LIGHT-EMITTING DIODE DRIVING CIRCUIT AND SECONDARY SIDE CONTROLLER FOR CONTROLLING THE SAME

FIELD OF THE INVENTION

The present invention relates to a light-emitting diode (LED) driving circuit and secondary side controller for controlling the same that provides the dimming function, and more particularly to an LED driving circuit and secondary side controller for controlling the same that is able to control the LED driving voltage at a first driving voltage and a second driving voltage.

BACKGROUND OF THE INVENTION

Please refer to FIG. 1 that is a diagram of a conventional Buck converter for driving light-emitting diode (LED). When the transistor switch Q2 is turned on, current is supplied from the power source V4 and flows through the transistor switch Q2 to store energy in the inductor L1 and the capacitor C, meanwhile the current supplies energy to LEDs D2, D5 for the same to emit light. When the transistor switch Q2 is turned off, energy is released from the inductor L1 and the capacitor C4 to the LEDs D2, D5 for the same to emit light continuously. The current flowed through the LEDs D2, D5 causes a voltage drop at two ends of the resistor R7 to thereby generate a current detection signal. The error amplifier U4 receives at the negative input thereof the current detection signal and at the positive input thereof a voltage reference signal Vref, and outputs an error amplification signal at the output thereof according to the received signals. The pulse width modulation (PWM) comparator U5 receives the error amplification signal and a triangular wave signal, compares the two signals, and outputs a PWM signal to determine the turn-on duration of the transistor switch Q2 in each cycle, so as to control the amount of energy supplied by the power source V4 to the buck converter. Basically, the turn-on duration of the transistor switch Q2 is controlled by a feedback voltage to generate sufficient voltage and current, so that a voltage across the resistor R7 is the same as a preset value. In the event the output current is exceeded or insufficient, the voltage across the resistor R7 will change, which in turn changes the turn-on duration of the transistor switch Q2 for keeping the output current at a stable current.

Please refer to FIG. 1 again. The buck converter for driving LED also uses a NAND gate U7A to simultaneously receive a dimming signal and the PWM signal, so as to achieve the dimming function. When the input dimming signal is low level, the output at the NAND gate U7A turns to high level to turning off the power transistor Q2. When the transistor Q2 is turned off, the inductor L1 and the capacitor C4 release energy via the diode D8 to keep the LEDs D2, D5 emitting light. However, since the dimming signal has a relatively long period, the inductor L1 and the capacitor C4 will keep releasing energy until the output voltage (that is, the voltage at the connection point of the inductor L1 and the capacitor C4) is lower than the threshold voltage of the LEDs D2, D5, and then the LEDs D2, D5 no longer emit light. However, since there are some current leakage paths, the output voltage will keep dropping until all the stored energy in the inductor L1 and the capacitor C4 is completely released. When the dimming signal turns to high level, the output at the NAND gate U7A turns to be controlled by the PWM signal and the previously described feedback control is resumed to obtain stable light emission. In this manner, the ratio of the turn-on duration to the turn-off duration of LED is controlled by changing the pulse width of the pulse signal to thereby obtain an average brightness and achieve the purpose of dimming.

Since the above-described dimming operates at two extremities of turn-on and turn-off, an overly high transient voltage will be generated. FIG. 2 shows the operating voltage and current waveforms of the above conventional LED driving circuit. As shown, the voltage varies between zero volt and N*VF volt, where N is the number of LEDs being connected in series; VF is the forward bias voltage of an LED with a predetermined current flowed through the LED; and N*VFmin is the threshold voltage of. If there are several tens of LEDs connected in series, the voltage difference between the two ends of the LEDs shall be as high as several hundreds of volts. And, when the output voltage is dropped from N*VF to N*VFmin, the LEDs almost stop emitting light, as shown in FIG. 2. At this point, the capacitor releases the stored energy at a gradually slowed speed until all the stored energy is completely released. The LEDs require time to be turned on again. Under this circumstance, when an excessively high voltage is instantaneously supplied to the LEDs, some of the LEDs would withstand a voltage stress much higher than that as stipulated in the specification thereof when they are differently turned on. This condition surely would dangerously cause burnout of these LEDs. Therefore, the above-described conventional LED driving circuit must be provided with a voltage ramp-up control circuit to solve the above-mentioned problems. However, the provision of the voltage ramp-up control circuit not only increases the cost of the LED driving circuit, but also increases the transient time of voltage variation during the dimming operation to thereby adversely affect the accuracy in dimming control.

SUMMARY OF THE INVENTION

A primary object of the present invention is to provide an improved LED driving circuit that enables an LED module to maintain a basic voltage at two ends thereof when the LED module is dimmed, so as to ensure that there is only a relatively small voltage variation of the LED module during dimming, and it is not necessary for the LED driving circuit to consider the output voltage rising time or additionally include an output current limiting circuit for protecting the LEDs against the risk of damage. Therefore, the cost of the LED driving circuit may be reduced and the layout on a printed circuit board (PCB) may be simplified.

To achieve the above and other objects, the LED driving circuit according to a first embodiment of the present invention includes a conversion circuit, an LED module, a current detector, and a control module. The conversion circuit converts an input voltage into an output voltage according to a control signal. The LED module is coupled with the conversion circuit and emits light according to the output voltage. The current detector is coupled with the LED module and generates a current detection signal according to a current flowed through the LED module. The control module generates the control signal according to the current detection signal and a dimming signal, so that the output voltage is controlled at a first driving voltage or a second driving voltage. Wherein, when the output voltage is controlled at the first driving voltage, the LED module is in a stably lighting state; and when the output voltage is controlled at the second driving voltage, the output voltage is approximate to a threshold voltage of the LED module, so that the LED module is close to a non-lighting state.

Another LED driving circuit according to a second embodiment of the present invention includes a conversion circuit, an LED module, a current detector, a voltage detector, and a control module. The conversion circuit converts an input voltage into an output voltage according to a control signal. The LED module is coupled with the conversion circuit and emits light according to the output voltage. The current detector is coupled with the LED module and generates a current detection signal according to a current flowed through the LED module. The voltage detector is coupled with the LED module to generate a voltage detection signal according to a voltage applied across the LED module. The control module generates the control signal according to the current detection signal, the voltage detection signal, and a dimming signal, so that the output voltage is controlled at a first driving voltage or a second driving voltage. Wherein, when the output voltage is controlled at the first driving voltage, the LED module is in a stably lighting state; and when the output voltage is controlled at the second driving voltage, the output voltage is approximate to a threshold voltage of the LED module, so that the LED module is close to a non-lighting state.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The spirit of the present invention is that, an output voltage of an LED driving circuit is controlled at a first driving voltage or a second driving voltage during dimming. When the output voltage is controlled at the first driving voltage, an LED module is in a current feedback control mode to maintain a stable light-emitting state; and when the output voltage is controlled at the second driving voltage, the LED module is in a voltage feedback control mode and the output voltage is approximate to a threshold voltage of the LED module but larger than zero volt, so that the LED module is close to a non-lighting state. Preferably, the output voltage controlled at the second driving voltage is slightly lower than the threshold voltage of the LED module to ensure that the LED module does not emit light. In this manner, the voltage applied across the LED module has a variation smaller than that in the conventional LED driving circuits As a result, the problems of an excessively large voltage stress withstood by the LEDs and inaccurate dimming control as found in the conventional LED driving circuits can be avoided.

The above-mentioned control may be achieved by switching between a constant current and a constant voltage, or by switching between a constant current and a minimum duty cycle. The present invention will now be described in more details with some preferred embodiments thereof.

Figure 1:
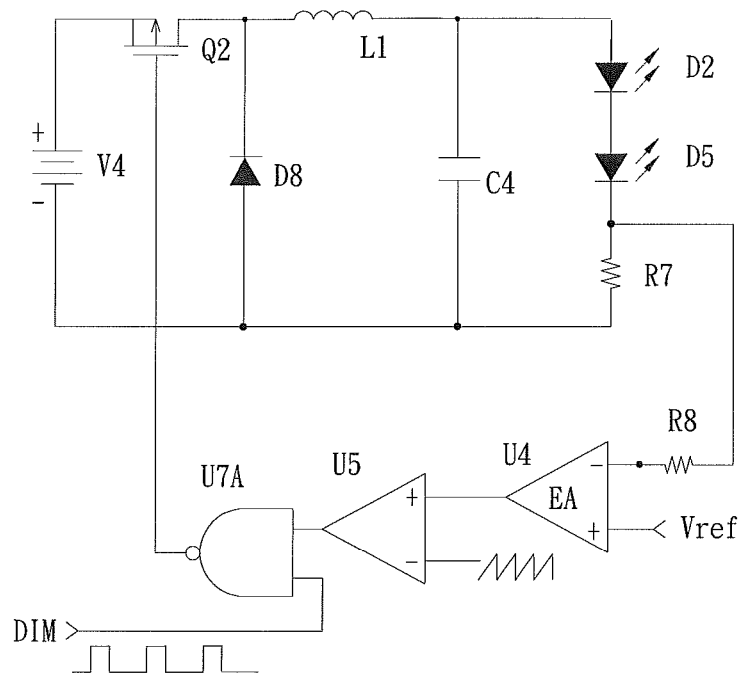
FIG. 1 is a circuit diagram of a conventional Buck converter for driving LED.
Figure 2:
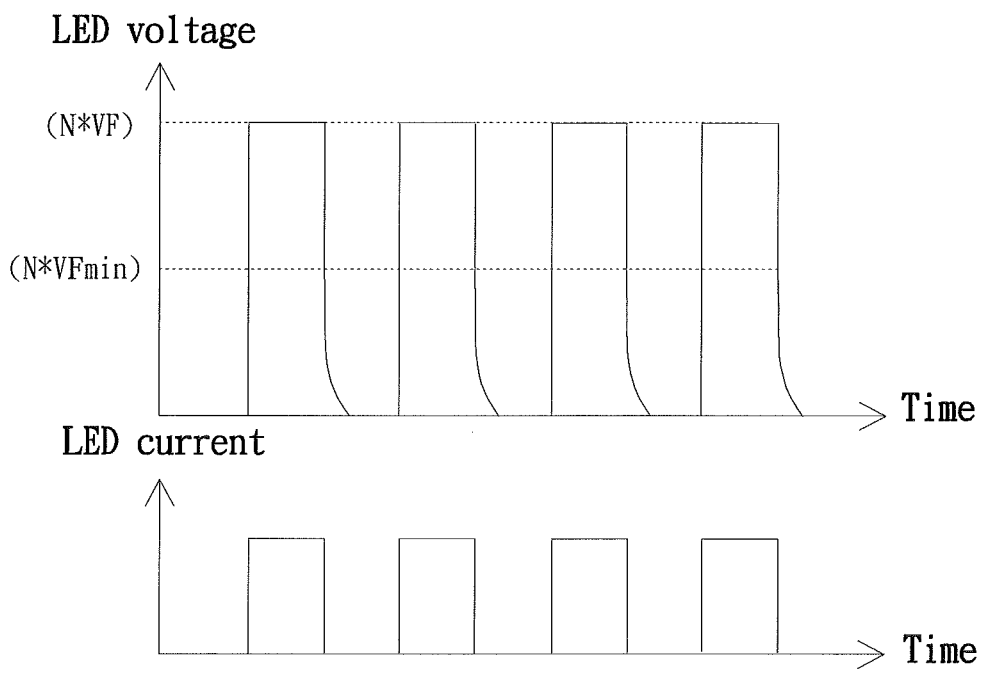
FIG. 2 shows the driving voltage and driving current waveforms of the conventional LED driving circuit of FIG. 1.
Figure 3A:
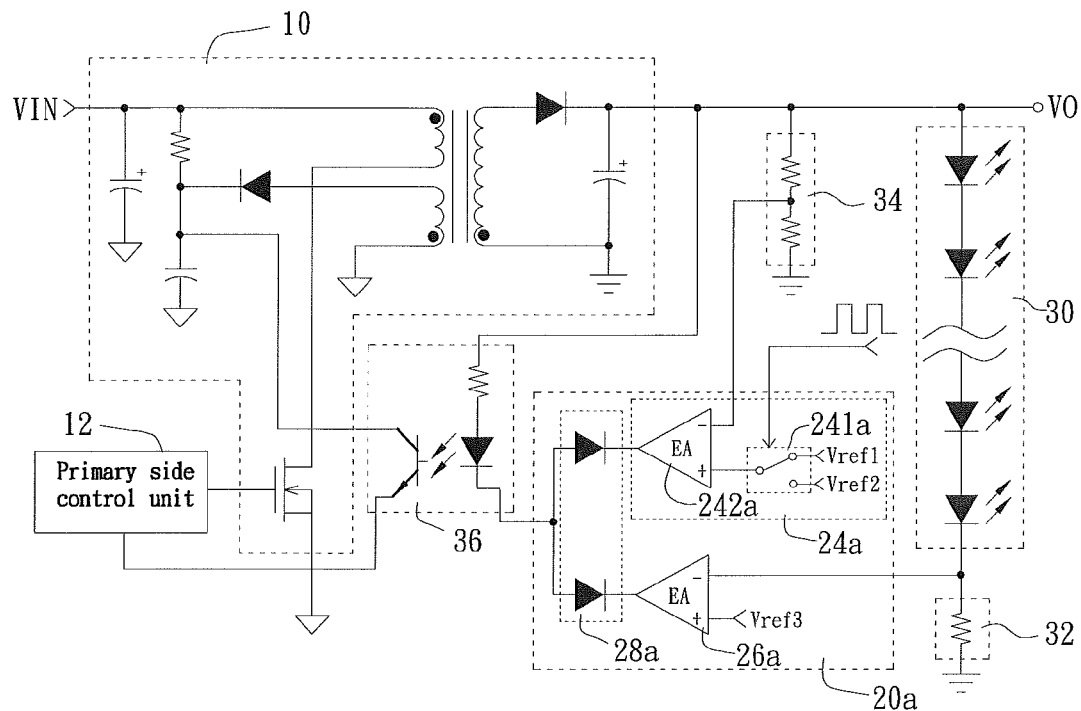
FIGS. 3A to 3D are some LED driving circuit diagrams according to different embodiments of the present invention.

FIG. 3A is an LED driving circuit diagram according to a first embodiment of the present invention, which is designed for switching between a constant current mode and a constant voltage mode. As shown, the LED driving circuit includes a conversion circuit 10, a control module, an LED module 30, a current detector 32, and a voltage detector 34. The control module includes a primary side control unit 12, a secondary side control unit 20a, and an isolation unit 36. The conversion circuit 10 converts an input voltage VIN into an output voltage VO according to a control signal from the primary side control unit 12, and the output voltage VO is used to drive the LED module 30. The voltage detector 34 detects a voltage of the LED module 30 and outputs a voltage detection signal. The current detector 32 is connected to the LED module 30 in series to detect a current flowed through the LED module 30 and generates a current detection signal. The secondary side control unit 20a receives the voltage detection signal, the current detection signal, and a dimming signal, and generates a secondary side control signal according to the received signals. The secondary side control signal is sent to the primary control unit 12 via the isolation unit 36, which is an optocoupler in the illustrated first embodiment, but may be a transformer or other isolators in practical applications. The primary side control unit 12 may be a conventional PWM controller to generate the control signal according to the secondary side control signal, so as to control the conversion circuit 10 to convert the input voltage VIN into the output voltage VO. In the illustrated first embodiment, the conversion circuit 10 is a AC to DC flyback converter circuit, but may be a forward, a half-bridge, or a full-bridge converter circuit in practical applications, without being limited to any particular type.

The secondary side control unit 20a includes a voltage detection signal processor 24a, a current detection signal processor 26a, and a signal selection circuit 28a. The voltage detection signal processor 24a receives the voltage detection signal and the dimming signal, and generates a voltage processing signal according to the received signals. The current detection signal processor 26a receives the current detection signal and generates a current processing signal. The signal selection circuit 28a receives the voltage processing signal and the current processing signal, and selectively outputs one of the voltage processing signal and the current processing signal, depending on the levels of the two signals. In the illustrated first embodiment, the dimming signal is a pulse signal, which is input to the voltage detection signal processor 24a for regulating the level of the voltage processing signal output by the voltage detection signal processor 24a.

The voltage detection signal processor 24a includes a signal selector 241a and an error amplifier 242a. According to the dimming signal, the signal selector 241a selectively outputs a relatively higher first reference voltage Vref1 or a relatively lower second reference voltage Vref2. The error amplifier 242a receives at a non-inverting input thereof the first reference voltage Vref1 or the second reference voltage Vref2 output by the signal selector 241a, and receives at an inverting input thereof the voltage detection signal output by the voltage detector 34, and outputs the voltage processing signal according to the received signals.

The current detection signal processor 26a is an error amplifier, which receives at a non-inverting input thereof a third reference voltage Vref3 and receives at an inverting input thereof the current detection signal output by the current detector 32, and outputs the current processing signal according to the received signals.

The signal selection circuit 28a includes two diodes, which have negative terminals separately coupled with the voltage detection signal processor 24a and the current detection signal processor 26a, and positive terminals all coupled with the isolation unit 36, and selectively output the voltage processing signal or the current processing signal, whichever is lower in level.

In the illustrated first embodiment, when the dimming signal is at a first level that represents "OFF", the signal selector 241a outputs the relatively lower second reference voltage Vref2, so that the voltage detection signal processor 24a lowers the level of the output voltage processing signal. At this point, the voltage processing signal has a level lower than that of the current processing signal, and the signal selection circuit 28a selects to output the voltage processing signal. Therefore, the LED driving circuit operates in a constant voltage mode, the output voltage drops to approximately the threshold voltage of the LED module 30. At this point, the LED module 30 is close to not emitting light.

On the other hand, when the dimming signal is at a second level that represents "ON", the signal selector 241a outputs the relatively higher first reference voltage Vref1, so that the voltage detection signal processor 24a raises the level of the output voltage processing signal. At this point, the signal selection circuit 28a selects to output the current processing signal. Therefore, the LED driving circuit operates in a constant current mode, the output voltage rises for the current flowing through the LED module 30 to stably maintain at a preset current value, and so the LED module 30 emits light stably.

As a result, the output voltage of the LED driving circuit is either at a first driving voltage (that is, in the constant current mode, in which the current stably maintains at a preset current value) or at a second driving voltage (that is, in the constant voltage mode, in which the voltage stably maintains at a preset voltage value) and the two driving voltages have a relative small difference between them to thereby avoid the problems in the conventional LED driving circuits. Moreover, in the event the circuit is opened to bring the current detection signal fed back by the current detector 32 to have a very low level, the output voltage VO would keep rising until the voltage detection signal from the voltage detector 34 reaches the first reference voltage Vref. At this point, the voltage detection signal processor 24a has control over the feedback control again to thereby limit the output voltage VO to a maximum value thereof and achieve the function of overvoltage protection.

While the dimming signal may control the input signal at the non-inverting input of the voltage detection signal processor 24a to achieve the purpose of controlling the output signal level, it may also achieve the above function by controlling the level of the input signal at the inverting input of the voltage detection signal processor 24a, or by directly controlling the level of the output signal at the output of the voltage detection signal processor 24a, or even by controlling any input signal or output signal of the current detection signal processor 26a. Please refer to FIG. 3B, which shows an LED driving circuit diagram according to a second embodiment of the present invention for controlling the input signal level at the inverting input of the error amplifier 242a. In this second embodiment, the voltage detector 34 includes a first voltage dividing section 34a and a second voltage dividing section 34b; and the signal selector 241a is used to switch a voltage division ratio of the voltage detector 34 to thereby achieve the function of switching the LED driving circuit to the constant current mode or the constant voltage mode.

Figure 3B:
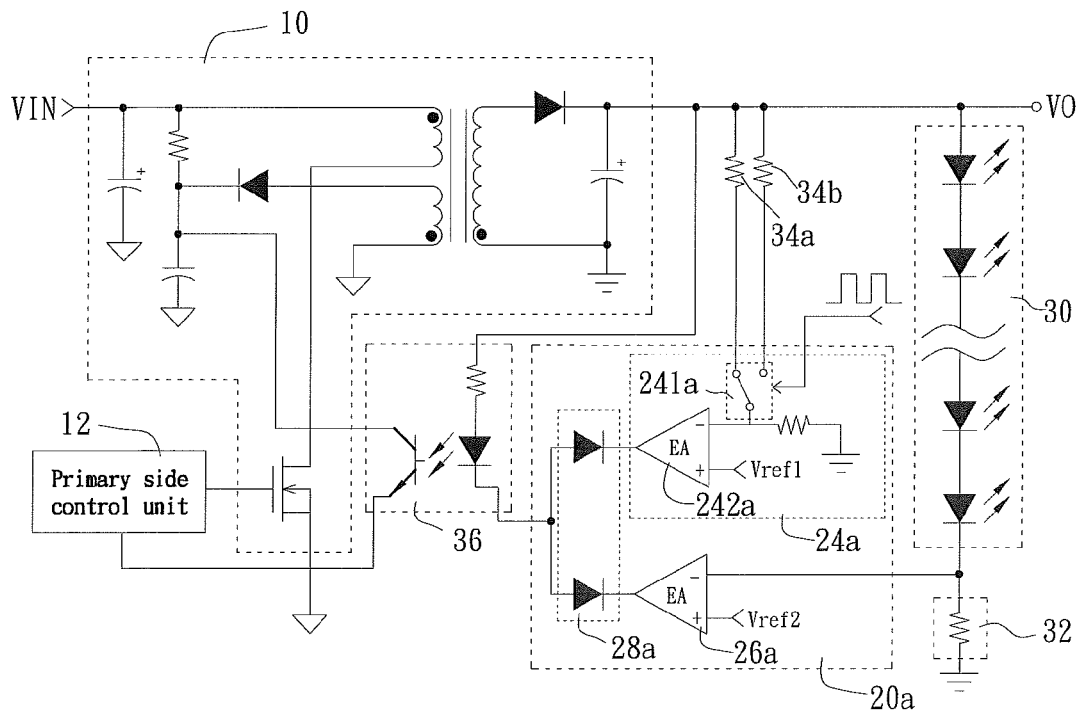

In practical application, the dimming signal may be DC (direct current) dimming, such as the DC dimming signal DCDIM, pulse signal in FIG. 3B, or clock dimming without particular limitation. Wherein, in the clock dimming, the number of clock signals is counted within a predetermined length of time to convert into the duty cycle of dimming.

Figure 3C:
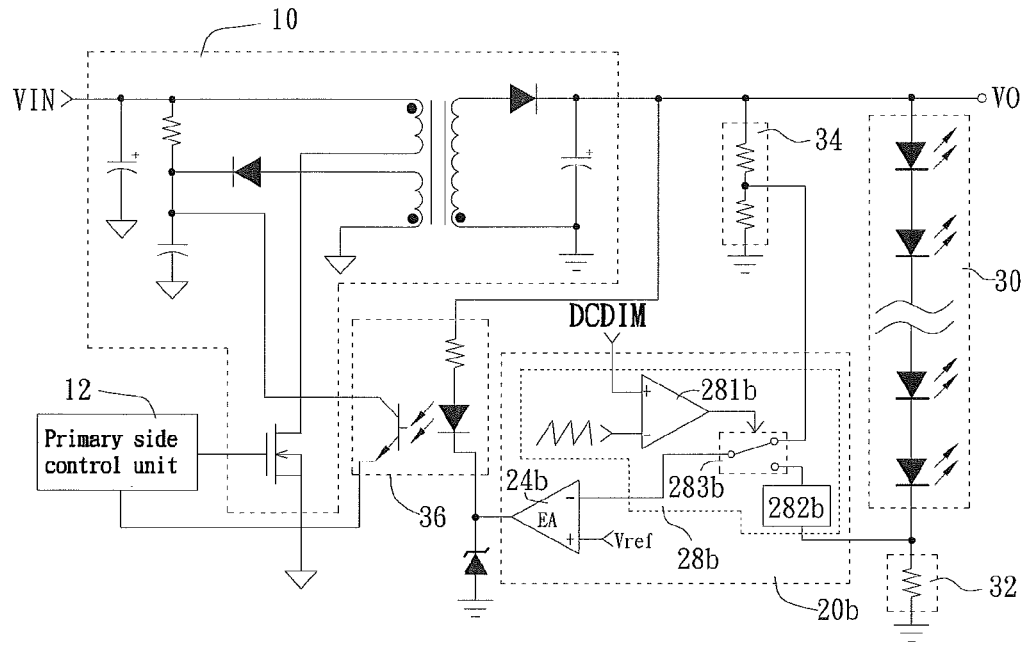

FIG. 3C shows an LED driving circuit diagram according to a third embodiment of the present invention for DC dimming. That is, in the third embodiment, the dimming extent is represented by the level of the dimming signal. In this embodiment, the secondary control unit 20b includes a signal processor 24b and a signal selection circuit 28b. The signal selection circuit 28b receives a DC dimming signal, a voltage detection signal, and a current detection signal, and selects, according to the DC dimming signal, to output the voltage detection signal or the current detection signal to the primary side control unit 12 via the isolation unit 36, so that the primary side control unit 12 controls the conversion circuit 10 according to the received signal. The third embodiment is different from the first embodiment in that the dimming signal is a DC signal, and that the signal selection circuit 28b is arranged in front of the signal processor 24b to reduce the number of signal processors.

The signal selection circuit 28b includes a DC-to-pulse converter 281b, a level shifter 282b, and a signal selector 283b. The DC-to-pulse converter 281b maybe a comparator, and receives at a non-inverting input thereof the DC dimming signal DCDIM and at an inverting input thereof a triangular-wave signal, and outputs a pulse signal according to the received signals. The level shifter 282b regulates the level of the received current detection signal to be in the same range as the level of the voltage detection signal. The signal selector 283b receives the current detection signal output by the level shifter 282b and the voltage detection signal output by the voltage detector 34, and selects to output the current detection signal or the voltage detection signal according to the pulse signal output by the DC-to-pulse converter 281b.

The signal processor 24b is an error amplifier, it receives at a non-inverting input thereof a reference voltage Vref and at an inverting input thereof the signal output by the signal selector 283b, and outputs a secondary side control signal to the isolation unit 36 according to the received signals. The isolation unit 36 is coupled with a Zener diode 38 as an output overvoltage protection to clamp the output voltage VO to the maximum output voltage value in the event of a circuit abnormality that results in abnormal rising of the output voltage VO.

In the third embodiment, when the pulse signal output by the DC-to-pulse converter 281b is at a first level representing "OFF", the signal selector 283b outputs the voltage detection signal. Therefore, the LED driving circuit operates in the constant voltage mode, and the output voltage drops to approximately the threshold voltage of the LED module 30. At this point, the LED module 30 is close to not emitting light. On the other hand, when the pulse signal selected and output by the DC-to-pulse converter 281b is at a second level representing "ON", the signal selector 283b selects to output the current detection signal. Therefore, the LED driving circuit operates in the constant current mode, the output voltage rises for the current flowing through the LED module 30 to stably maintain at a preset current value, and the LED module 30 emits light stably.

Figure 3D:
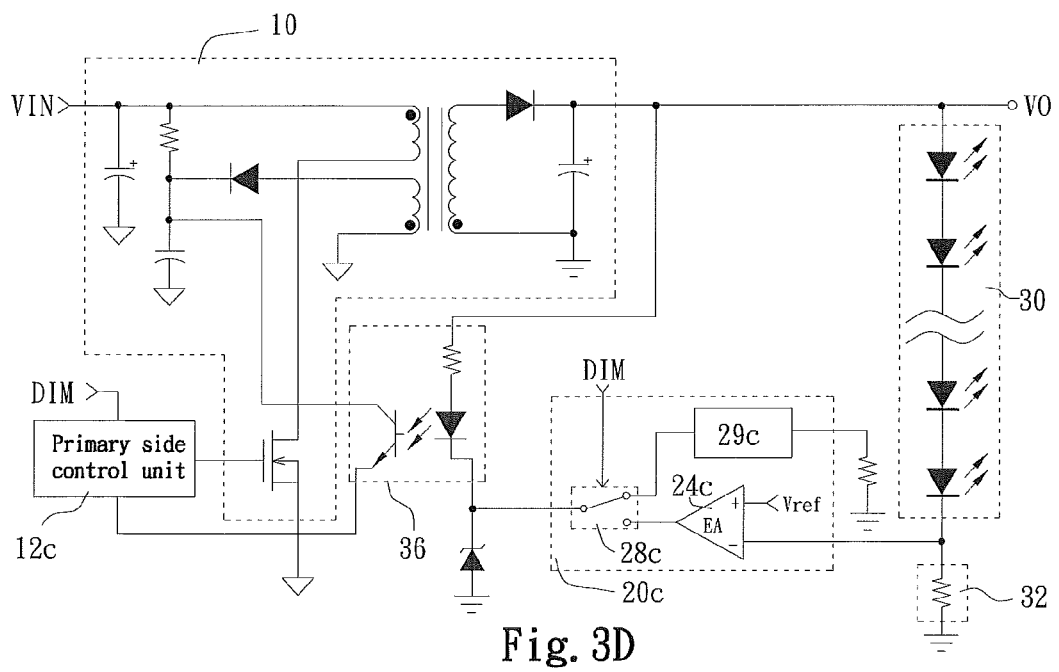

As having been mentioned above, the present invention may be implemented by switching between a constant current and a minimum duty cycle. Please refer to FIG. 3D that is an LED driving circuit diagram according to a fourth embodiment of the present invention for dimming control through switching between a constant current and a minimum duty cycle. In the fourth embodiment, there is a secondary side control unit 20c, which includes a signal processor 24c, a minimum duty cycle signal generator 29c, and a signal selector 28c. The signal processor 24c is an error amplifier and outputs a current processing signal according to the current detection signal generated by the current detector 32 and a reference voltage Vref. The minimum duty cycle signal generator 29c may be externally set to a specific minimum duty cycle in order to be regulated according to different application environments. For example, the minimum duty cycle may be set via an external resistor as in the illustrated fourth embodiment, or via a capacitor or other means. The signal selector 28c receives the current processing signal and a minimum duty cycle signal generated by the minimum duty cycle signal generator 29c, and selectively outputs one of the two received signals according to a dimming signal DIM. The primary side control unit 12c receives the signal output by the secondary side control unit 20c via the isolation unit 36, and controls the conversion circuit 10 according to the received signal.

In the fourth embodiment, when the dimming signal DIM is at a first level representing "OFF", the signal selector 28c selects to output the minimum duty cycle signal. Through the properly set minimum duty cycle, the control signal output by the primary side control unit 12c according to the minimum duty cycle signal has a very small duty cycle, so that the energy transmitted from the conversion circuit 10 to the secondary side is approximately sufficient for maintaining the basic energy loss by the circuit elements other than the LED module 30. In other words, the driving voltage stops dropping when it is approximately the threshold voltage of the LED module 30, and maintains around a voltage. At this point, the LED module 30 is close to not emitting light. On the other hand, when the dimming signal DIM is at a second level representing "ON", the signal selector 28c selects to output the current detection signal. Therefore, the LED driving circuit operates in the constant current mode, the output voltage rises for the current flowing through the LED module 30 to stably maintain at a preset current value, and the LED module 30 emits light stably.

Figure 4:
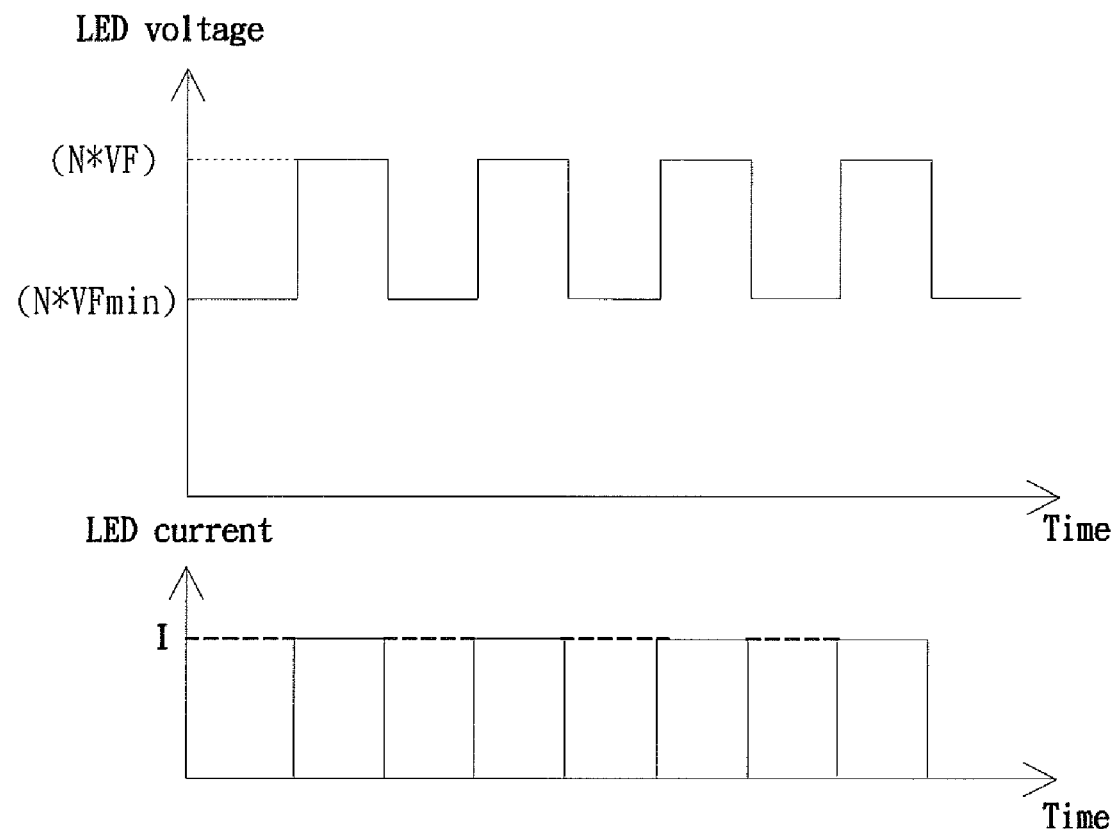
FIG. 4 shows the driving voltage and driving current waveforms of LED modules according to the embodiments of the present invention.

Please refer to FIG. 4 that shows the driving voltage and driving current waveforms of LED modules according to the embodiments of the present invention. When the dimming signal DIM is at a level representing "ON", the driving voltage of the LED module maintains approximately at the first driving voltage N*VF. At this point, the driving current of the LED module is stably controlled at I. On the other hand, when the dimming signal DIM is at a level representing "OFF", the driving voltage of the LED module maintains approximately at the second driving voltage N*VFmin. At this point, the driving current of the LED module is or is close to zero. In this manner, the dimming function may still be achieved while the driving voltage variation in the LED of the present invention is smaller than that in the conventional LED techniques.

What is claimed is:

1. A light-emitting diode (LED) driving circuit, comprising:
   a conversion circuit, which converts an input voltage into an output voltage according to a control signal;
   an LED module being coupled with the conversion circuit and emitting light according to the output voltage;
   a current detector being coupled with the LED module and generating a current detection signal according to a current flowed through the LED module; and
   a control module, including a secondary side control unit being coupled with the current detector and coupled with an isolation unit for receiving the signal output by the secondary side control unit and accordingly generating a secondary side signal, generating the control signal according to the current detection signal and a dimming signal, so as to control the output voltage at a first driving voltage or a second driving voltage;
   wherein when the output voltage is controlled at the first driving voltage, the LED module is in a stably lighting state; and when the output voltage is controlled at the second driving voltage, the LED module is close to a non-lighting state;
   wherein the second driving voltage is approximate to a threshold voltage of the LED module.

2. The LED driving circuit as claimed in claim 1, wherein the control module further comprises:
   a primary side control unit being coupled with the isolation unit for generating the control signal according to the secondary side signal;
   wherein the secondary side control generates a current processing signal according to the current detection signal and outputs the current processing signal or a minimum duty cycle signal according to the dimming signal.

3. The LED driving circuit as claimed in claim 2, wherein the secondary side control unit includes:
   a signal processor for receiving the current detection signal and generating a current processing signal accordingly;
   a minimum duty cycle signal generator for generating a minimum duty cycle signal; and
   a signal selector being coupled with the signal processor and the minimum duty cycle signal generator, and selectively outputting one of the current processing signal and the minimum duty cycle signal according to the dimming signal.

4. The LED driving circuit as claimed in claim 3, wherein the signal processor includes an error amplifier, receiving the current detection signal and a reference voltage for generating the current processing signal.

5. An LED driving circuit, comprising:
   a conversion circuit, which converts an input voltage into an output voltage according to a control signal;
   an LED module being coupled with the conversion circuit and emitting light according to the output voltage;
   a current detector being coupled with the LED module and generating a current detection signal according to a current flowed through the LED module;
   a voltage detector being coupled with the LED module and generating a voltage detection signal according to a voltage applied across the LED module; and
   a control module, which generates the control signal according to the current detection signal, the voltage detection signal, and a dimming signal, so as to control the output voltage at a first driving voltage or a second driving voltage;
   wherein when the output voltage is controlled at the first driving voltage, the LED module is in a stably lighting state; and when the output voltage is controlled at the second driving voltage, the LED module is close to a non-lighting state;
   wherein the second driving voltage is approximate to a threshold voltage of the LED module.

6. The LED driving circuit as claimed in claim 5, wherein the control module includes:
   a secondary side control unit being coupled with the current detector and the voltage detector; the secondary side control unit generating a current processing signal and a voltage processing signal according to the current detection signal and the voltage detection signal, respectively, and selectively outputting the current processing signal or the voltage processing signal according to the dimming signal;

an isolation unit being coupled with the secondary side control unit for receiving the signal output by the secondary side control unit and accordingly generating a secondary side signal; and a primary side control unit being coupled with the isolation unit for generating the control signal according to the secondary side signal.

7. The LED driving circuit as claimed in claim 6, wherein the secondary side control unit includes:

a current signal processor for receiving the current detection signal and generating a current processing signal accordingly;

a voltage signal processor for receiving the voltage detection signal and the dimming signal, and generating a voltage processing signal accordingly; and a signal selector being coupled with the current signal processor and the voltage signal processor, and selectively outputting one of the current processing signal and the voltage processing signal according to the current processing signal and the voltage processing signal.

8. The LED driving circuit as claimed in claim 7, wherein the current signal processor includes a first error amplifier, and the first error amplifier receives the current detection signal and a first reference voltage to generate the current processing signal.

9. The LED driving circuit as claimed in claim 7, wherein the voltage signal processor includes a second error amplifier, and the second error amplifier receives the voltage detection signal and a second reference voltage to generate the voltage processing signal.

10. The LED driving circuit as claimed in claim 9, wherein a voltage level of one of the second reference voltage and the voltage detection signal is regulated according to the dimming signal.

11. The LED driving circuit as claimed in claim 6, wherein the secondary side control circuit comprises:

a current signal processor for receiving the current detection signal and the dimming signal, and generating a current processing signal accordingly;

a voltage signal processor for receiving the voltage detection signal and generating a voltage processing signal accordingly; and a signal selector being coupled with the current signal processor and the voltage signal processor, and selectively outputting one of the current processing signal and the voltage processing signal according to the current processing signal and the voltage processing signal.

12. The LED driving circuit as claimed in claim 11, wherein the current signal processor includes a first error amplifier, and the first error amplifier receives the current detection signal and a first reference voltage to generate the current processing signal.

13. The LED driving circuit as claimed in claim 12, wherein a voltage level of one of the first reference voltage and the voltage detection signal is regulated according to the dimming signal.

14. The LED driving circuit as claimed in claim 11, wherein the voltage signal processor includes a second error amplifier, and the second error amplifier receives the voltage detection signal and a second reference voltage to generate the voltage processing signal.

15. The LED driving circuit as claimed in claim 11, wherein the secondary side control circuit comprises:

a signal selection circuit being coupled with the voltage detector and the current detector and selectively outputting one of the voltage detection signal and the current detection signal according to the dimming signal; and a signal processor being coupled with the signal selection circuit and outputting the secondary side signal according to the signal output by the signal selection circuit.

16. The secondary side control circuit as claimed in claim 15, wherein the signal selection circuit comprises:

a level regulator, coupled with the current detector for regulating a level of the current detection signal; and the signal selector, coupled with the level regulator and the voltage detector and outputting one of the regulated current detection signal and the voltage detection signal according to the dimming signal.

17. The secondary side control circuit as claimed in claim 16, wherein the signal selection circuit further comprises a signal converter, the dimming signal is a DC dimming signal and the signal converter converts the dimming signal into a pulse signal to control the signal selector.

* * * * *